(12) United States Patent
Kirvan

(10) Patent No.: US 6,976,509 B1
(45) Date of Patent: Dec. 20, 2005

(54) METHOD AND APPARATUS FOR PRESSURIZING PLASTIC PIPE

(76) Inventor: Clifford J. Kirvan, 152 White Oak Dr., Titusville, PA (US) 16354

( * ) Notice: Subject to any disclaimer, the term of this patent is extended or adjusted under 35 U.S.C. 154(b) by 0 days.

(21) Appl. No.: 10/910,689

(22) Filed: Aug. 2, 2004

(51) Int. Cl.⁷ .............................................. F16L 55/10
(52) U.S. Cl. ...................... 138/89; 138/90; 215/355; 215/247; 220/DIG. 19
(58) Field of Search .............................. 138/89, 90, 97; 215/355, 358, 247; 220/232, DIG. 19

(56) References Cited

U.S. PATENT DOCUMENTS

| | | | |
|---|---|---|---|
| 1,702,972 A | 2/1929 | Larsen | 137/269 |
| 2,321,667 A | 6/1943 | Foster | 220/802 |
| 2,577,780 A | 12/1951 | Lockhart | 604/415 |
| 2,848,130 A * | 8/1958 | Jesnig | 215/45 |
| 2,921,708 A * | 1/1960 | Marcel | 215/230 |
| 3,106,206 A * | 10/1963 | Barr, Sr. et al. | 600/577 |
| 3,136,440 A * | 6/1964 | Krug et al. | 215/247 |
| 3,200,984 A | 8/1965 | Fueslein et al. | 220/240 |
| 3,233,727 A | 2/1966 | Wilson | 215/247 |
| 3,358,869 A | 12/1967 | Palmer et al. | 138/894 |
| 3,362,225 A | 1/1968 | Noble | 73/49.1 |
| 3,508,653 A * | 4/1970 | Coleman | 210/789 |
| 3,574,312 A | 4/1971 | Miller | 138/96 |
| 3,604,591 A | 9/1971 | Seltzer | 220/24.5 |
| 3,821,969 A * | 7/1974 | Sinko | 138/89 |
| 3,875,012 A * | 4/1975 | Dorn et al. | 435/243 |
| 3,932,222 A * | 1/1976 | Dorn | 435/288.1 |
| 4,016,696 A | 4/1977 | Mess et al. | 52/514 |
| 4,083,788 A * | 4/1978 | Ferrara | 210/516 |
| 4,111,326 A * | 9/1978 | Percarpio | 215/247 |
| 4,136,794 A * | 1/1979 | Percarpio | 215/247 |
| 4,186,840 A * | 2/1980 | Percarpio | 215/247 |
| 4,226,333 A * | 10/1980 | Percarpio | 215/247 |
| 4,241,919 A | 12/1980 | Foreman | 273/72 A |
| 4,295,572 A * | 10/1981 | Percarpio | 215/247 |
| 5,207,247 A | 5/1993 | Hood | 138/89 |
| 5,224,515 A * | 7/1993 | Foster et al. | 138/89 |
| 6,237,620 B1 | 5/2001 | Ferguson | 137/209 |

FOREIGN PATENT DOCUMENTS

| | | |
|---|---|---|
| FR | 2657673 A1 | 1/1990 |
| GB | 2078899 A | 6/1980 |
| JP | 409141634 A | 11/1995 |
| WO | WO 92/15820 | 3/1991 |

* cited by examiner

Primary Examiner—Patrick Brinson
(74) Attorney, Agent, or Firm—Wayne L. Lovercheck

(57) ABSTRACT

A system and apparatus for pressurizing pipe includes a resilient and compressible plug insertable into the opposed ends of the pipe for sealing the pipe. The plug includes a plug body having a larger outside diameter than the inside diameter of the pipe, a flange that limits insertion of the plug into the pipe, and a blind hole coaxial with the plug for receiving the rod of a pushing member used to force and push the plug into the pipe. The rod has a smaller diameter than the hole for allowing the plug to compress during insertion for fitting into the pipe. After insertion of the plugs pipe pressurization occurs by securement of the needle end of an air pressure gun to a cylindrical needle shield that is circumjacently placed on the pipe for needle end alignment whereupon the needle end perforates the plug for pipe pressurization, and as the needle end is withdrawn the plug body compresses and closes the temporary needle slot thereby sealing the pipe.

28 Claims, 5 Drawing Sheets

METHOD AND APPARATUS FOR PRESSURIZING PLASTIC PIPE

FIELD OF THE INVENTION

The present invention pertains to systems and devices for blocking orifices for maintaining internal pressure, and more particularly pertains to a method and apparatus for pressurizing plastic pipe that allows the end user to immediately determine that pipe integrity has been maintained upon preparation of the pipe for installation.

BACKGROUND OF THE INVENTION

Conduit of varying lengths, diameters and materials of composition plays an integral role in contemporary industrial, technological society. The conduit includes pipe and tubing that is straight, flexible and corrugated, and can be copper, galvanized or, predominantly, of a durable, long-lasting plastic composition such as polyethylene, ABS, or PVC. Such conduit has wide applicability as water and sewerage lines and as protective channels for electrical wires.

Plastic pipe has long been manufactured by a process in which internal air pressure was pumped inside to push the plastic material outwardly to form the pipe. Using this method the plastic pipe was crimped closed and cut at desired lengths holding the internal air pressure inside. Thus, the pipe consumer is accustomed to hearing the air pressure escape when the crimp is cut off when the pipe is being installed. This escaping air is expected by the customer indicating that the pipe is intact.

More recently, plastic pipe has been manufactured by an extrusion and vacuum-forming process wherein the pipe comes off an extruder machine, the vacuum is used to pull the plastic outwardly to form the pipe, and, the pipe is cut to the desired length, and wound in coils. As there is no crimping, and there is no internal air pressure present; there is no escaping air sound upon installation as the customer has come to expect. The signal that the pipe is airtight and free of defects is missing. At the installation site, the pipe is not closed so there is no release of air giving an audible signal thereby assuring the end user that the integrity of the pipe has been maintained. It is of critical importance that the integrity of the pipe be maintained from the factory to the job site, and that direct confirmation of the pipe integrity can be provided to the end user as even the most minute crack or fissure will render that length or segment of pipe unusable for many uses. The prior art discloses numerous systems, techniques, and devices for closing, sealing and pressurizing orifices, conduit, or conduit networks of various kinds.

For example, the Larsen Patent (U.S. Pat. No. 1,702,972) discloses an apparatus for injecting alcohol into frozen gas pipe to unfreeze the pipe, and includes a flow control valve mounted within a casing that is threaded onto the T-coupling of the gas pipe so that an alcohol syringe can be brought into flow communication with the gas pipe for injection of the alcohol.

The Foster Patent (U.S. Pat. No. 2,321,667) discloses a stopper for gas pipe wherein the stopper includes a plug insertable into the end of the pipe and a cylindrical sleeve that passes over the outside of the pipe thereby closing off the end of the pipe.

The Lockhart Patent (U.S. Pat. No. 2,577,780) discloses a cupped resilient plug having circumferential ridges and grooves that define a chamber for the ingress or egress of fluid by, for example, a hypodermic needle.

The Fueslein et al. Patent (U.S. Pat. No. 3,200,984) discloses a pressure seal plug for sealing the bore of a tube, and includes a cylindrical body portion having an inner cavity for pushing the plug into the tube bore and external deformable ribs that seal against the inside surface of the tube as the plug is forced therein.

The Wilson Patent (U.S. Pat. No. 3,233,727) discloses a pressurized container for tennis balls wherein the container includes a cap having an integral air valve through which an air needle can be inserted for the injection or withdrawal of air into or from the container to maintain the contents within under positive or negative pressure.

The Palmer et al. Patent (U.S. Pat. No. 3,358,869) discloses a vacuum sealing plug that includes annular external ring portion on the plug body for sealing against the inside surface of the tube.

The Noble Patent (U.S. Pat. No. 3,362,225) discloses a pressure testing apparatus for testing fire hoses and the like by attaching one end of the hose to the apparatus and plugging the other end of the hose, and then directing water into the apparatus for pressure testing.

The Miller Patent (U.S. Pat. No. 3,574,312) discloses a flexible and elastic closure that can be placed over the end of a pipe for closing off that end, or the closure can be inserted into the bore of the pipe for blocking the bore and preventing fluid flow therethrough.

The Seltzer Patent (U.S. Pat. No. 3,604,591) discloses a cylindrical stopper capable of receiving an expander that expands the stopper for plugging an opening or orifice.

The Mess et al. Patent (U.S. Pat. No. 4,016,696) discloses a plug for sealing holes in concrete walls and the plug includes a cylindrical and tapered body having a socket for receiving a rod so that the plug can be pushed into the hole for sealing the hole after the rod is removed.

The Foreman Patent (U.S. Pat. No. 4,241,919) discloses an aluminum baseball bat with a hollow interior and an end formed by a solid rubber plug whereupon a needle inserted into and through the plug can be used to vary the fluid pressure of the hollow interior of the bat.

The Hood Patent (U.S. Pat. No. 5,207,247) discloses a system and apparatus for plugging a tube and includes a major cylindrical portion for containing therein a push rod, a tapered minor cylindrical portion for insertion into the bore of the tube, and a conical-shaped, deformable and expansible stopper that is forced by the push rod through the tapered minor cylindrical portion and into the tube bore for plugging the bore.

The Ferguson Patent (U.S. Pat. No. 6,237,620 B1) discloses a tool for plumbing system maintenance and includes a tool for interconnection between an air compressor and a faucet so that compressed air can be introduced to purge the system and then anti-freeze can be introduced for winterization of the plumbing system.

Other Patents related to pressurizing, testing or plugging conduit or conduit networks include Japanese Patent PCT No. WO/92/15820 for detection and localization of leaks in a conduit system, Japanese Patent No. JP409141634A for pressurizing rubber hose so that caulking rings are inserted at both ends of the hose without protruding, UK Patent No. GB 2078899 for a plug for sealing an orifice wherein the plug includes an insert that expands during insertion for sealing the plug in the orifice, and French Patent No. FR002657673A1 for a method for pressurizing PVC pipe without deformation or damage to the pipe.

Nonetheless, despite the ingenuity of the above systems and devices, there remains a need for a pipe pressurization method and apparatus that is easy to manipulate, adaptable for various conduit types and diameters, and provides an immediate signal to the end user that pipe integrity has been maintained.

SUMMARY OF THE INVENTION

The present invention comprehends a method and apparatus for pressurizing conduit, and with an emphasis on pressurizing flexible plastic pipe formed by an extrusion process wherein the pipe is extruded, cut to predetermined lengths and then coiled for shipment and sale.

The present invention includes a generally cylindrical, pliable and compressible plug having a plug body with a diameter greater than the inside diameter of the pipe, and a flange at the base of the body that serves as a stop for limiting the depth of insertion of the plug into the end of the pipe. The plug also includes a blind hole coaxial with the plug body at the base of the plug and which extends into the plug body. A plug insertion member is used to push and force the plug into the end of the pipe for sealing the pipe, and includes a generally cylindrical handle for manual gripping and a push or ramrod that extends from the handle. The push rod is inserted into the blind hole and has a diameter smaller than the blind hole of the plug thus providing clearance for the plug body to inwardly compress about the push rod facilitating the insertion of the plug into the end of the pipe.

The method and apparatus also includes a cylindrical needle shield sized to slide over the end of the pipe, and the needle shield includes a disc-shaped needle-positioning member that is mounted at one end of the pipe. The needle-positioning member includes a central threaded aperture to which the needle end of an air pressure gun is secured. After the plugs have been seated at both ends of the pipe for sealing off the interior bore of the pipe, the needle end of the air pressure gun is secured to the threaded aperture of the needle-positioning member, and then the needle shield is slid over the end of the pipe thereby bringing the needle of the air gun into coaxial alignment with the blind hole of the plug. The needle is then forced through the plug body for projection into the sealed pipe bore so that the interior of the pipe can be appropriately pressurized. The needle is then withdrawn from the pipe bore and back through the body of the plug, and as the needle is withdrawn the deformable plug compresses the slot temporarily formed by the insertion of the needle collapsing and closing the slot and thus causing the pressurized interior bore of the pipe to be completely sealed from the external environment.

It is an object of the present invention to provide a method and apparatus for pressurizing pipe that is adaptable for pipe and like conduit of various diameters and materials of composition.

It is another object of the present invention to provide a method and apparatus for pressurizing pipe that is portable and easy to operate.

It is yet another object of the present invention to provide a method and apparatus for pressurizing pipe that provides the end user with immediate visual and audible confirmation that pipe integrity has been maintained upon preparation of the pipe for installation.

These and other objects, features, and advantages will become apparent to one skilled in the art upon a perusal of the following detailed description read in conjunction with the accompanying drawing figures.

DETAILED DESCRIPTION OF THE PREFERRED EMBODIMENT

Illustrated in FIGS. 1 through 12 is a method and apparatus for pressurizing conduit, and especially flexible plastic pipe that is formed by an extrusion process whereby the plastic pipe comes off an extruder machine and is cut into predetermined lengths and wrapped in coils for shipment, storage and sale. The ends of the plastic pipe are plugged and sealed by the following apparatus and then pressurized to a greater than ambient air pressure while still remaining plugged and sealed and wrapped in coils for shipment, storage and sale. When the plastic pipe arrives at the job site—and prior to installation—the plastic pipe is cut and the air held under pressure is released with an easily audible whoosh or rushing sound of escaping air. This signals to the end user that the integrity of the plastic pipe has been maintained—that no cracks or fissures have developed on the body of the plastic pipe that would render the pipe defective and unusable and that no foreign matter has entered the pipe. This method provides a direct and immediate confirmation—or disconfirmation if no rush of air is detected—on whether or not the integrity of the plastic pipe has been maintained throughout the storage, handling and shipping.

Figure 1:
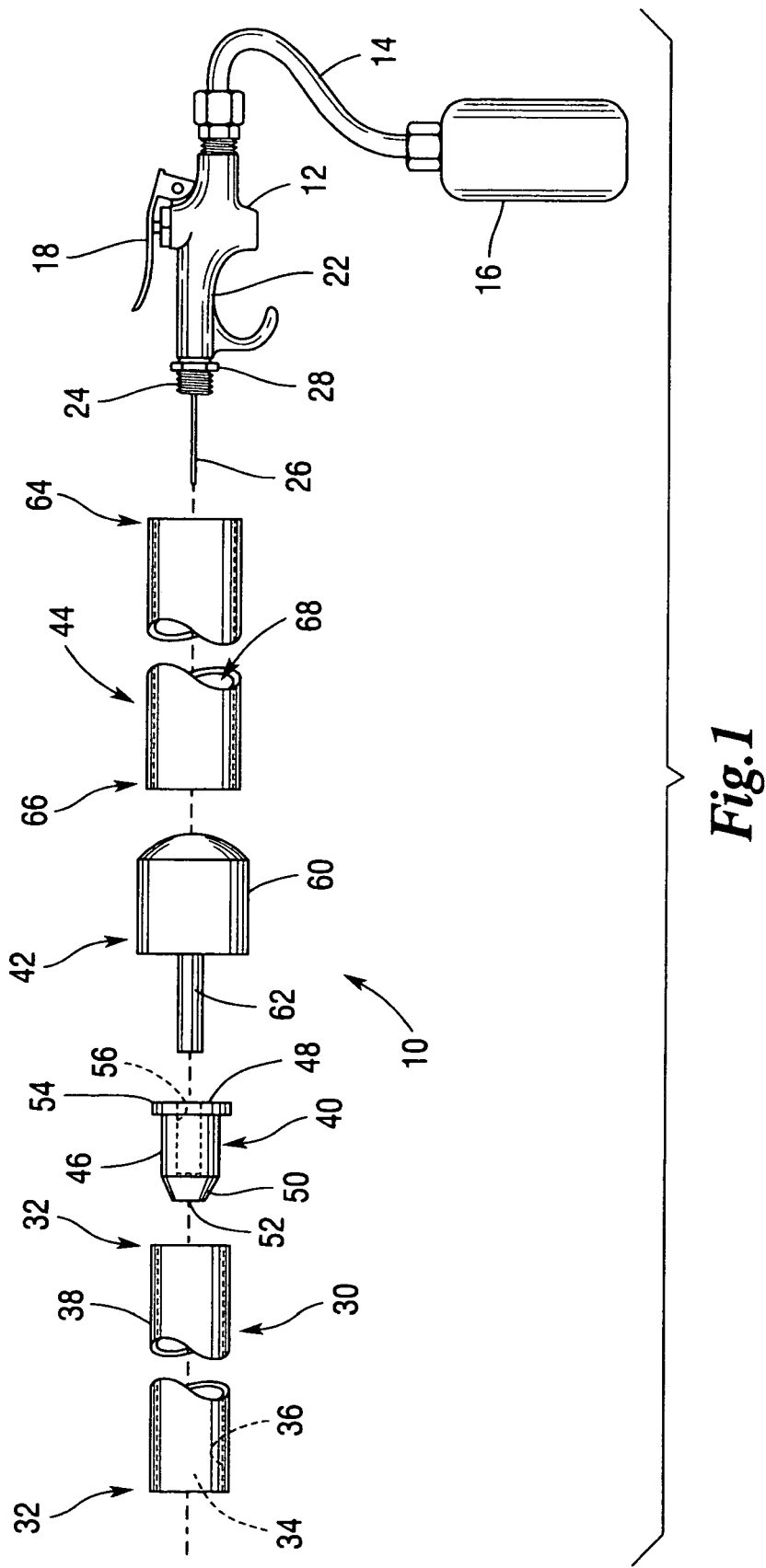
FIG. 1 is an exploded view of the method and apparatus of the present invention showing the disposition of all the structural elements that comprise the pipe pressurization system and apparatus.
Figure 2:
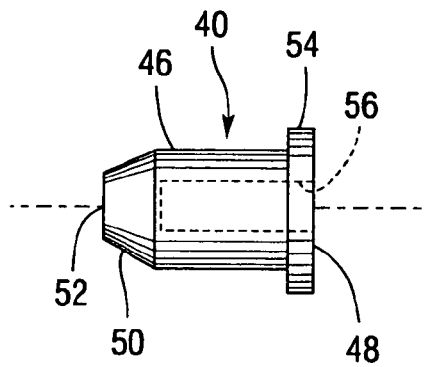
FIG. 2 is a side elevational view of the method and apparatus of the present invention illustrating the compressible and deformable plug that is one element of the pipe pressurization system and apparatus.
Figure 3:
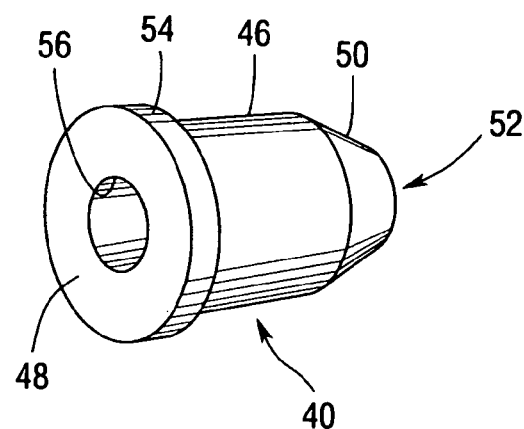
FIG. 3 is an isometric view of the method and apparatus of the present invention showing the coaxial blind hole that is integrally formed at one end of the plug.
Figure 4:
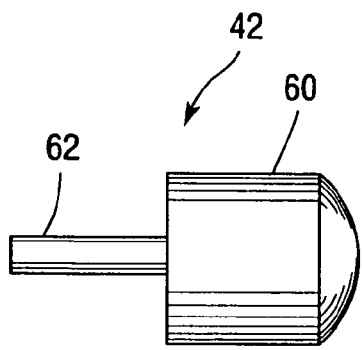
FIG. 4 is a side elevational view of the method and apparatus of the present invention illustrating the plug insertion tool that is another element of the pipe pressurization system and apparatus.

Thus, shown in FIG. 1 are the elements of apparatus 10 for pressurizing the plastic pipe. Apparatus 10 includes a standard air pressure gun 12 that is connected by an airline 14 to a source of pressurized air 16. Air gun 12 includes a trigger 18 for starting, stopping and controlling the flow of pressurized air 20 (shown in FIG. 11) from air source 18, a barrel 22, a forward needle mount 24 on which a needle 26 is mounted for discharging the pressurized air, and a jamb nut 28 that assists in securing needle 26 in place as will be hereinafter further described. Plastic pipe 30 to be pressurized includes opposed ends 32 and an interior bore 34, and further includes an inner surface 36 that defines an inside diameter and an exterior surface 38 that defines an outside diameter. Apparatus 10 includes a pliable, stretchable and compressible plug 40 for sealing each end 32 of pipe 30, a manually graspable plug insertion tool 42 for pushing and forcing plug 40 into the respective ends 32 of pipe 30, and a cylindrical needle shield 44 slidable onto one of the ends 32 of pipe 30, and sized to encompass pipe 30 for aligning needle 26 with plug 40 so that needle 26 can be inserted into and through plug 40 for raising the interior pressure of bore 34 of pipe 30 and then withdrawn from pipe 30 after air pressurization.

More specifically, as shown in FIGS. 1 through 3, 5, 6, 10 and 11, plug 40 includes a generally cylindrical stretchable, compressible and deformable plug body 46 composed of a durable rubber composition that allows plug 40 to deform, elongate, and decrease in diameter for seating plug 40 within bore 34 at one end 32 of pipe 30 with an airtight fit or seal. Plug body 46 has a slightly larger diameter than the inside diameter of pipe 30 that facilitates the tight fitting and seating of plug 40 at pipe end 32 so that the airtight closure of the interior of pipe 30 is obtained. Plug 40 includes a base end 48 and an opposite tapered insertion end 50 that terminates with a flat blunt nose or end portion 52. Circumjacent base 48 is a flange 54 that is at least equal to the outside diameter of pipe 30. Flange 54 thus serves as a stop as shown most distinctly in FIGS. 11 and 12 for limiting the depth of insertion or penetration of plug 40 within bore 34 of pipe 30 and for preventing the entire plug 40 from being inserted into bore 34 of pipe 30. Plug 40 also includes a blind hole 56 that extends inwardly from base 48 within body 46 of plug 40 and is coaxial with body 46 of plug 40.

Figure 5:
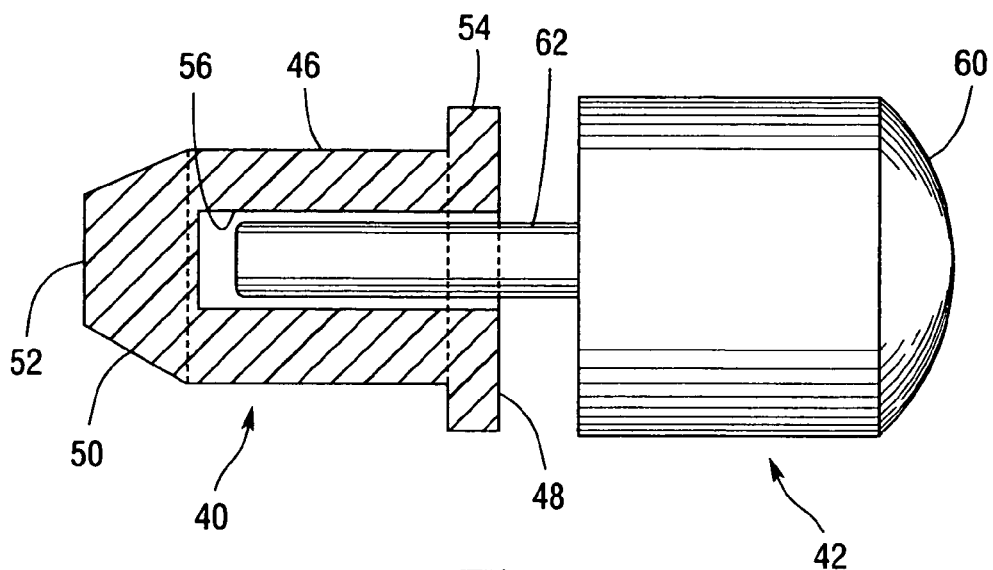
FIG. 5 is a side elevational view of the method and apparatus of the present invention illustrating the alignment of the plug insertion tool with the plug prior to the plug insertion tool forcing the plug into the bore adjacent one end of the pipe.
Figure 6:
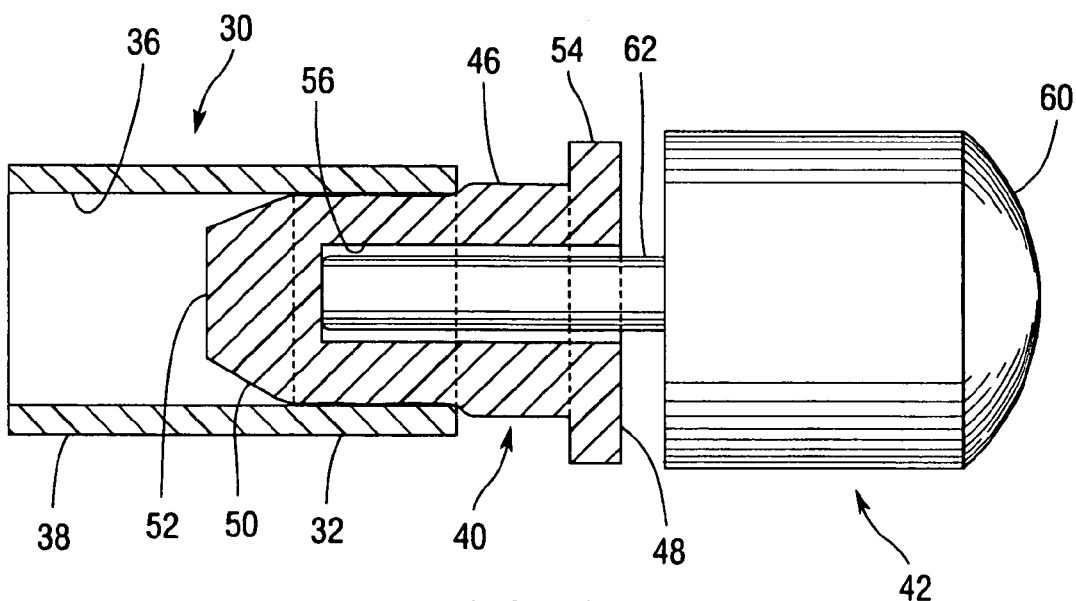
FIG. 6 is a side elevational view of the method and apparatus of the present invention illustrating the plug insertion tool inserting the plug into the bore of the pipe with the plug insertion tool stretching and forcing the plug into the pipe bore.
Figure 7:
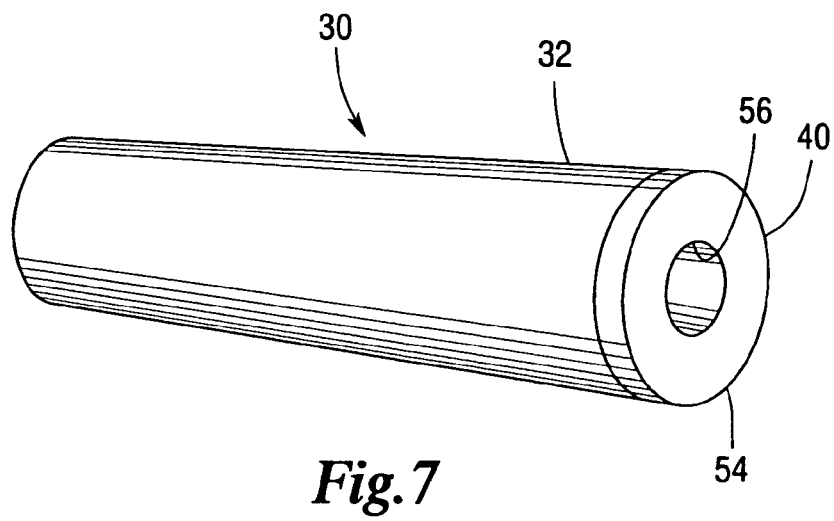
FIG. 7 is an isometric view of the method and apparatus of the present invention illustrating the end of the pipe and the disposition of the plug after the plug has been inserted into the bore adjacent the end of the pipe.
Figure 8:
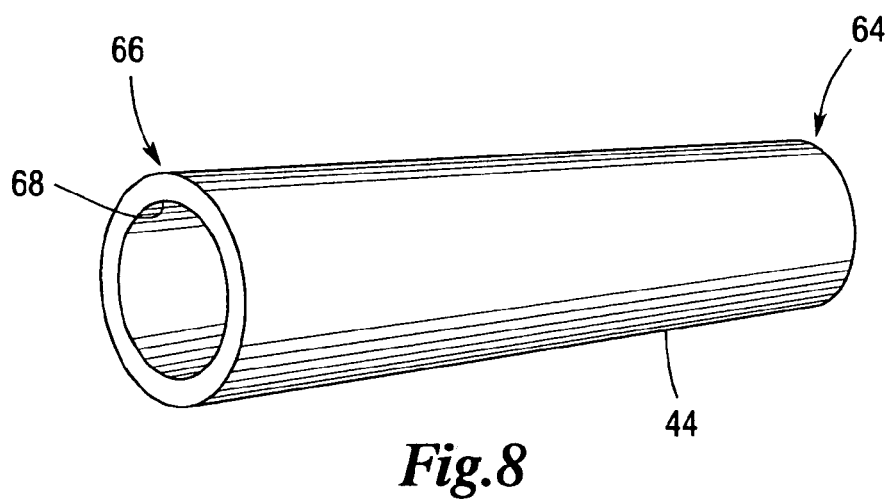
FIG. 8 is an isometric view of the method and apparatus of the present invention illustrating the end of the needle shield that is another element of the pipe pressurization system and apparatus.

The method and apparatus 10 of the present invention also includes an easy-to-use tool for manually pushing and inserting plug 40 into bore 34 at ends 32 of pipe 30. Specifically, as shown in FIGS. 1 and 4 through 6, the tool is the plug insertion tool 42 that includes a generally cylindrical handle 60 that can be comfortably held in one's hand and a push rod 62 that is mounted to and extends from handle 60. As shown in FIGS. 5 and 6, push rod 62 is inserted into hole 56 of plug 40 for pushing and inserting plug 40 into end 32 of pipe 30. The length of push rod 62 must exceed the length of hole 56 in plug body 46 for obtaining the proper seating of plug 40 at ends 32 of pipe 30, and the diameter of push rod 62 must be less than the diameter of hole 56 to allow for the easy and quick insertion of push rod 62 into hole 56 and the removal of push rod 62 therefrom after plug 40 has been seated within end 32 of pipe 30. In addition, push rod 62 must be smaller than hole 56 so that plug body 46 can radially decrease in diameter as plug 40 is being pushed into end 32 of pipe 30. The smaller diameter of push rod 62 relative to hole 56 thus provides plug 40 with internal clearance for fitting within end 32 of pipe 30.

As shown in FIGS. 1 and 7 through 12, apparatus 10 includes cylindrical needle shield 44 for aligning and guiding needle 26 into plug 40 and then into bore 34 of pipe 30 for pressurizing pipe 30. Needle shield 44 includes an inner end 64 and an opposite outer end 66 with outer end 66 being defined as that end that is first slid on and over pipe 30 and inner end 64 being defined as that end which is located adjacent plug 40 and the end of pipe 30 after insertion. Needle shield 44 also includes a passageway 68 that extends from inner end 64 to outer end 66, and when needle shield 44 is placed on pipe 30 at one end 32 thereof, pipe 30—with plug 30 already seated within and sealing that end 32 of pipe 30—is concentrically encompassed by needle shield 44.

Figure 9:
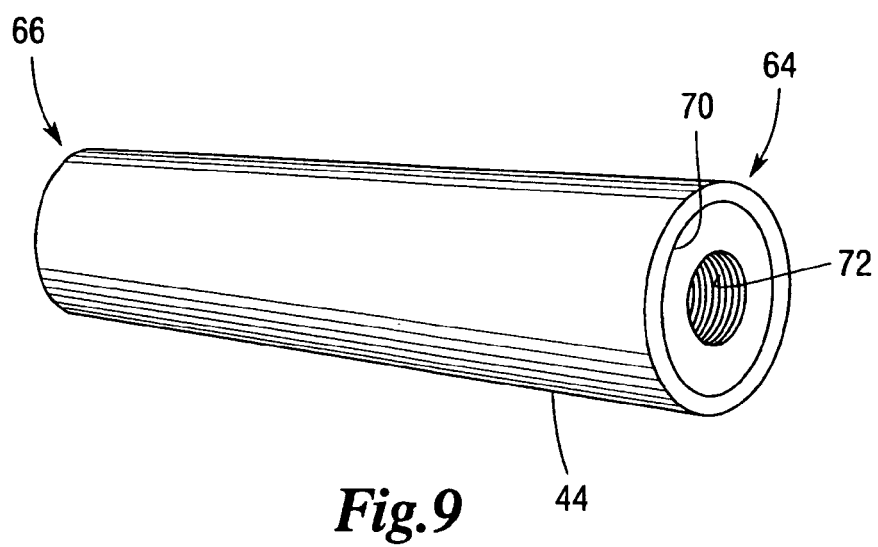
FIG. 9 is an isometric view of the method and apparatus of the present invention illustrating the needle-positioning member that is disposed within the bore and at one end of the needle shield.

As shown in FIG. 9 needle shield 44 also includes a needle-positioning member 70 that is disc-shaped and has a centrally located threaded aperture 72 to which needle mount 24 of air gun 12 is secured for holding, stabilizing and aligning needle 26 with hole 56 in plug 40 prior to pressurization of pipe 30. Thus, just prior to and then during the actual inflating or charging of pipe 30 with excess air pressure, needle 26 of air gun 12, threaded aperture 72 and hole 56 of plug 40 are disposed in coaxial alignment so that needle 26 can easily and without error or deflection be inserted through hole 56 for perforating tapered end 50 of plug 40 so that pressurized air can be discharged from needle 26 and into bore 34 of pipe 30 that is sealed at both ends 32.

Figure 10:
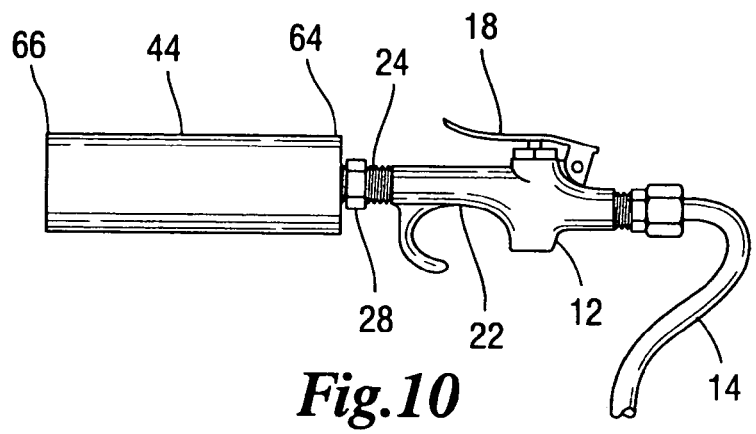
FIG. 10 is a side elevational view of the method and apparatus of the present invention illustrating the insertion of the plug at the end of the pipe and the alignment of an air pressure gun with the needle shield so that the needle of the air pressure gun can penetrate through the plug for pressurizing the pipe.
Figure 11:
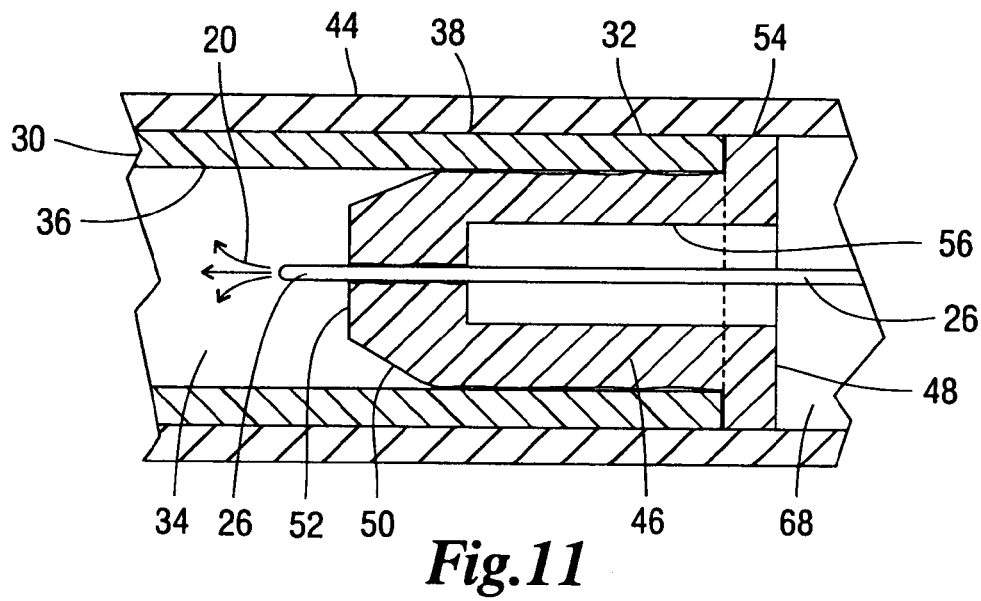
FIG. 11 is a sectioned side elevational view of the method and apparatus of the present invention illustrating the needle of the air pressure gun inserted into and through the plug for discharging air into the pipe for pressurizing the pipe.
Figure 12:
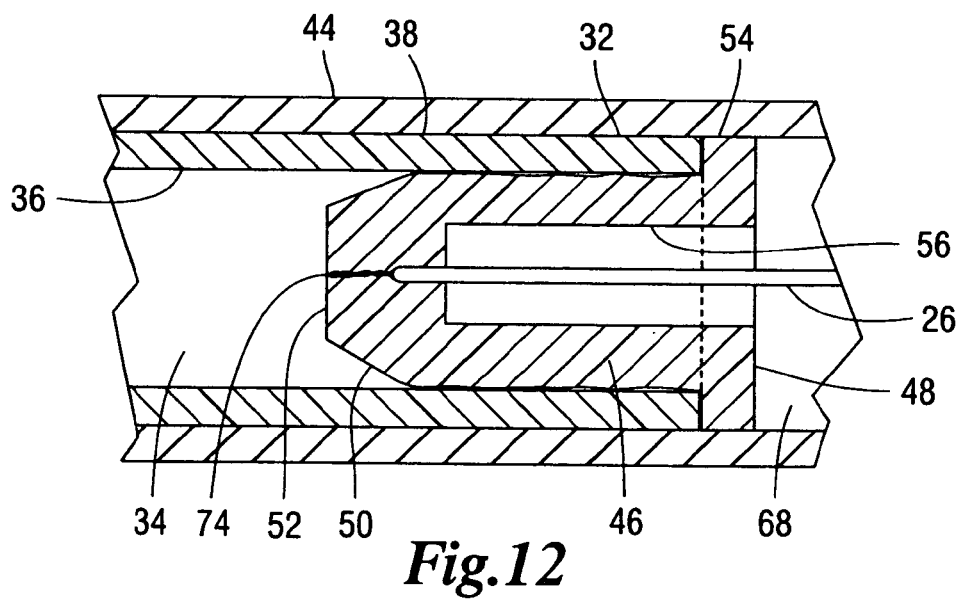
FIG. 12 is a sectioned side elevational view of the method and apparatus of the present invention illustrating the withdrawal of the needle from the plug after pipe pressurization and the closure of the temporary needle hole by compression of the plug as the needle is withdrawn.

With reference to FIGS. 1 through 12, a representative method for inflating and pressurizing pipe 30 to greater than ambient air pressure will now be described. Plug 40 is first positioned adjacent end 32 of pipe 30 with hole 56 of plug 40 in axial alignment with bore 34 of pipe 30 as shown in FIG. 1. The user would then grasp handle 60 of plug insertion tool 42 and align push rod 62 within hole 56 of plug 40, and then push rod 62 would be forced against the inner end of hole 56 causing plug 40 to stretch and slightly compress thereby decreasing the diameter of plug 40. The deformability of plug 40 allows plug body 46 to enter into bore 34 and seat within end 32 of pipe 30 as shown in FIGS. 6, 11 and 12. Plug 40 is held under compression against inner surface 36 of pipe 30 and forms an airtight closure at that end 32 of pipe 30. The depth of penetration of plug 40 within end 32 of pipe 30 is limited by flange 54 abutting end 32 of pipe 30 and forming a stop prohibiting further linear movement of plug 40 within the 34 of pipe 30 as shown in FIGS. 11 and 12.

The next step is to attach air gun 12 to needle shield 44 by securing needle mount 24 of air gun 12 to needle positioning member 70 of needle shield 44 as illustrated in FIGS. 9 and 10. This places needle 26 in coaxial alignment with passageway 68 of needle shield 44. The user then aligns needle shield 44 with end 32 of pipe 30 and slides needle shield 44 over end 32 of pipe 30 directing needle 26 into hole 56 of plug 40 and then perforating tapered end 50 of plug 40 with needle 26 so that needle 26 emerges within sealed interior bore 34 of pipe 30 as shown in FIG. 11. A temporary slot 74 is made through tapered end 50 of plug 40 by needle 26 perforating tapered end 50. With the user gripping air gun 12 with one hand trigger 18 is actuated so that air from pressure air source 16 is directed through needle 26 into bore 34 of pipe 30 for elevating the air pressure within bore 34 to greater than ambient air pressure. The user can confirm elevated air pressure with a separate air pressure gauge (not shown) for determining when the appropriate air pressure within interior bore 34 of pipe 30 is reached. After the appropriate air pressure within the sealed pipe 30 is obtained, the user actuates trigger 18 to shut off the airflow and commences to withdraw needle 26 back through tapered end 50 and hole 56 of plug 40. Because plug 40 is restrained under compression within end 32 of pipe 30, plug body 46 radially collapses about temporary slot 74 concomitant with the withdrawal of needle 26, as shown in FIG. 12, and completely closes temporary slot 74 when needle 26 is fully withdrawn from hole 56 of plug 40. Thus, the airtight seal is maintained by the compressible characteristic of plug 40 that prevents any escape of air or drop in air pressure within the now pressurized plastic pipe 30.

Although the invention has been described with reference to the particular preferred embodiment herein set forth, it is understood that the present disclosure has been made only by way of example and that numerous modifications, alterations, and variations may be made without departing from the spirit and scope of the invention. Thus, the scope of the invention should not be limited to the foregoing specification but rather by the scope of the appended claims.

I claim:

1. A method and apparatus for sealing the opposed ends of a length of plastic pipe and pressurizing the interior bore of the plastic pipe so that the user has immediate confirmation that the integrity of the pipe has been maintained when the pipe is readied for installation, comprising:

a plurality of plugs, each plug having a flexible and compressible plug body, a tapered insertion end and an opposite base end, a hole extending into the plug body from the base end and coaxial therewith, and a flange at the base end for restraining the insertion of the plug body into the bore of pipe;

a plug insertion tool for inserting a plug into each end of the pipe having a handle and a push rod extending from the handle with the diameter of the push rod being less than the diameter of the hole in the body of the plug;

a cylindrical, elongated needle shield for placement over the end of the pipe to facilitate the pressurization of the interior bore of the pipe after the plugs have sealed both ends of the pipe;

a disc-shaped needle-positioning member mounted at an end of the needle shield and having a centrally located threaded aperture;

a manually operable air pressure gun interconnected to a pressurized air source and having a needle through which pressurized air is delivered to the interior bore of the pipe; wherein the plugs are inserted at both ends of the pipe by the plug insertion member for sealing the interior of the pipe and the needle shield is concentrically placed over one end of the pipe for aligning the air pressure gun with the plug so that the needle can be directed through the hole of the plug for perforating the plug body, forming a temporary slot, and discharging pressurized air directed from the air pressure gun through the needle and into the bore thereby pressurizing the pipe and as the needle is withdrawn the plug body collapses and closes the temporary slot formed through the plug body by the needle perforation and subsequent withdrawal.

2. The method and apparatus for pressurizing pipe of claim 1 wherein the plug body is deformable and compressible and of a greater diameter than the inside diameter of the pipe so that the plug body can deform and compress during insertion into the pipe for obtaining an sealingly impervious fitting at the end of the pipe.

3. The method and apparatus for pressurizing pipe of claim 2 wherein the flange is circumjacent the base end of the plug body and has a diameter greater than the outside diameter of the pipe and serves as a stop for limiting the depth of insertion of the plug body within the bore of the pipe adjacent the pipe end.

4. The method and apparatus for pressurizing pipe of claim 3 wherein the tapered end of the plug body terminates with a flat blunt end portion.

5. The method and apparatus for pressurizing pipe of claim 4 wherein the handle of the plug insertion tool is cylindrical-shaped for manual gripping.

6. The method and apparatus for pressurizing pipe of claim 5 wherein the length of the push rod is greater than the length of the hole that extends through the plug body of the plug.

7. The method and apparatus for pressurizing pipe of claim 6 wherein the needle shield includes an inner end, an opposite outer end and a passageway extending therebetween coequal in length with the needle shield.

8. The method and apparatus for pressurizing pipe of claim 7 wherein the needle positioning member is mounted within the passageway at the outer end of the needle shield.

9. The method and apparatus for pressurizing pipe of claim 8 wherein the threaded aperture is coaxial with the passageway when the needle positioning member is placed within the passageway adjacent the outer end of the needle shield.

10. The method and apparatus for pressurizing pipe of claim 9 wherein the needle end of the air pressure gun is mounted to the threaded aperture of the needle positioning member and then the needle shield is placed over the end of the pipe so that the needle can be directed through the hole and the plug body for delivering pressurized air to the sealed bore of the pipe.

11. A method and apparatus for sealing the opposed ends of a plastic pipe and for pressurizing the interior bore of the plastic pipe so that the user has immediate confirmation that the integrity of the plastic pipe has been maintained when the pipe is cut and prepared for installation, comprising:

a plurality of pliable and compressible plugs insertable into the ends of the plastic pipe, each plug having a base end, an opposite tapered end, a hole extending from the base end into the plug, and a flange circumjacent the base end and having a diameter greater than the outside diameter of the plastic pipe to which the plug is mounted for limiting the depth of penetration of the plug within the end of the plastic pipe;

a plug insertion tool for pushing and seating a plug within each end of the plastic pipe and including a cylindrical handle and a push rod extending from the handle for insertion into the hole of the plug and the push rod having a diameter that is less than the diameter of the hole of the plug;

a cylindrical needle shield for concentric placement over the end of the plastic pipe to facilitate the pressurization of the interior bore of the pipe after each of the ends of the plastic pipe have been sealed by one plug;

a disc-shaped needle-positioning member mounted to the needle shield and having a centrally located threaded aperture;

an air pressure gun manually operable by one hand of the user interconnected to a pressurized air source and having a needle through which pressurized air can be delivered to the interior bore of the sealed plastic pipe; wherein the plugs insertable at both ends of the plastic pipe by the plug insertion tool pushing and stretching the plugs so that the plugs tightly fit within the ends of the plastic pipe for sealing the interior bore of the plastic pipe and the needle of the air pressure gun being coaxially mounted to the needle-positioning member whereupon the needle shield is concentrically placed about one end of the plastic pipe so that the needle can pass through the hole in the plug and perforate the plug, forming a temporary slot for delivering pressurized air to the interior bore for pressurizing the pipe and upon withdrawal of the needle back through the plug the compressibility of the plug causes the temporary slot in the plug formed by the needle perforation to completely close thereby sealing the interior bore of the plastic pipe and maintaining the pressurization of the plastic pipe.

12. The method and apparatus for pressurizing plastic pipe of claim 11 wherein the outside diameter of the body of the plug is greater than the inside diameter of the plastic pipe and the deformability and compressibility of the plug allows the plug to be pushed into the end of the plastic pipe by the plug insertion tool creating an air-tight closure of the end of the plastic pipe.

13. The method and apparatus for pressurizing plastic pipe of claim 12 wherein the flange adjacent the base end of the plug has a diameter greater than the outside diameter of the plastic pipe thereby providing the plug with a stop for limiting the depth of penetration of the plug within the end of the plastic pipe.

14. The method and apparatus for pressurizing plastic pipe of claim 13 wherein the tapered end of the plug terminates with a flat end portion.

15. The method and apparatus for pressurizing plastic pipe of claim 14 wherein the length of the push rod is greater than the length of the hole extending into the plug.

16. The method and apparatus for pressurizing plastic pipe of claim 15 wherein the needle shield includes a first inner end, an opposite second outer end, a passageway extending from the first inner end to the second outer end and having a diameter that is greater than the outside diameter of the plastic pipe so that the needle shield can be slipped over either end of the plastic pipe.

17. The method and apparatus for pressurizing plastic pipe of claim 16 wherein the needle-positioning member is mounted at the second outer end of the needle shield with the aperture being in coaxial alignment with the passageway of the needle shield.

18. The method and apparatus for pressurizing plastic pipe of claim 17 wherein the needle of the air pressure gun, the passageway of the needle shield and the hole of the plug are disposed in coaxial alignment when the air pressure gun is secured to the needle shield and the needle shield is placed on the end of the plastic pipe so that the needle can pass through the hole and perforate the tapered end of the plug for pressurizing the interior bore of the plastic pipe.

19. The method and apparatus for pressurizing plastic pipe of claim 18 wherein the concentric placement of the needle shield on the end of the plastic pipe and the securement of the needle end of the air pressure gun to the needle-positioning member aligns the needle with the hole of the plug and facilitate the pressurization of the sealed interior bore of the plastic pipe.

20. The method and apparatus for pressurizing plastic pipe of claim 19 wherein the perforation of the plug by the needle for pressurizing the interior bore of the plastic pipe creates a temporary needle slot that is completely closed concomitant with the withdrawal of the needle after pressurization by the plug being compressibly secured to the end of the plastic pipe.

21. A method of pressurizing a length of plastic pipe wherein each end of the plastic pipe is sealed by a stretchable and compressible plug, comprising the steps of:
    mounting a cylindrical needle shield to one end of the plastic pipe, the shield provided with a needle end of a pressure gun that is interconnected to a source of pressurized air attached to the needle shield;
    directing the needle of the air pressure gun into and through a plug hole of the plug;
    perforating the plug with the needle, forming a temporary slot so that the needle extends into the sealed interior bore of the plastic pipe;
    gripping the air pressure gun with one hand of the user;
    actuating a trigger mechanism on the air pressure gun so that pressurized air from the pressurized air source can pass through the needle and into the interior bore of the plastic pipe for raising the air pressure in the interior bore of the sealed plastic pipe to a level greater than ambient air pressure; and
    withdrawing the needle from the interior bore of the plastic pipe so that as the needle passes back through the plug the temporary slot formed in the plug by the needle perforation closes as a result of the radial inward compression of the plug about the temporary slot because of the plug being held under compression in its securement at the end of the plastic pipe.

22. The method and apparatus for pressurizing plastic pipe of claim 21 wherein the plug includes a tapered end, an opposite base end and a flange circumjacent the base end.

23. The method and apparatus for pressurizing plastic pipe of claim 22 wherein the diameter of the flange is greater than the inside diameter of the plastic pipe so that the flange provides a stop thereby limiting the depth of penetration of the plug at the end of the plastic pipe.

24. The method and apparatus for pressurizing plastic pipe of claim 23 further comprising a plug insertion tool for pushing and securing the plug to the end of the plastic pipe.

25. The method and apparatus for pressurizing plastic pipe of claim 24 wherein the plug insertion tool includes a manually graspable cylindrical handle.

26. The method and apparatus for pressurizing plastic pipe of claim 25 wherein the plug insertion tool includes a push rod that extends from the handle and is inserted into the plug hole of the plug for fitting the plug into the end of the plastic pipe.

27. The method and apparatus for pressurizing plastic pipe of claim 26 wherein the plug has an outside diameter that is greater than the inside diameter of the plastic pipe so that the plug is compressed as the plug is inserted into the end of the plastic pipe and held under compression at the end of the plastic pipe providing an air-tight closure for the plastic pipe.

28. The method and apparatus for pressurizing plastic pipe of claim 27 wherein the push rod of the plug insertion tool has a length greater than the hole of the plug to facilitate the insertion of the plug into the end of the plastic pipe.

* * * * *